United States Patent
Bhushan et al.

(10) Patent No.: US 12,190,175 B2
(45) Date of Patent: Jan. 7, 2025

(54) FUNCTION DEFINED EVENT STREAMS FROM MULTIPLE EVENT STREAMS AND EVENTS

(71) Applicant: INTERNATIONAL BUSINESS MACHINES CORPORATION, Armonk, NY (US)

(72) Inventors: Bharat Bhushan, Meriden (GB); Kaweepoj Phacharintanakul, Warwick (GB); Wolfgang von Drews, Crailsheim (DE); Matthew Whitehead, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 17/657,369

(22) Filed: Mar. 31, 2022

(65) Prior Publication Data
US 2023/0315545 A1    Oct. 5, 2023

(51) Int. Cl.
  G06F 7/06    (2006.01)
  G06F 9/30    (2018.01)
  G06F 9/38    (2018.01)
  G06F 9/54    (2006.01)

(52) U.S. Cl.
  CPC .......... G06F 9/542 (2013.01); G06F 9/30003 (2013.01); G06F 9/3851 (2013.01)

(58) Field of Classification Search
  CPC ..... G06F 9/542; G06F 9/30003; G06F 9/3851
  See application file for complete search history.

(56) References Cited

U.S. PATENT DOCUMENTS

| | | |
|---|---|---|
| 8,799,469 B2 | 8/2014 | Bedi |
| 9,098,328 B2 | 8/2015 | Lam |
| 9,396,234 B2 | 7/2016 | Lynch |
| 9,548,910 B2 | 1/2017 | Khan |
| 10,042,868 B2 | 8/2018 | Kucera |

(Continued)

OTHER PUBLICATIONS

Alvaro Villalba et al. Multi-tenant Pub/Sub Processing for Real-time Data Streams (Year: 2020).*

(Continued)

*Primary Examiner* — Kevin L Young
*Assistant Examiner* — Abdou K Seye
(74) *Attorney, Agent, or Firm* — Anthony M. Pallone (57) ABSTRACT

Disclosed are techniques for function-defined output streams corresponding to combinations of events published to one or more event notification streams in an event-driven architecture with a plurality of event notification streams. An output function is received defining a combination of event notifications with criteria for selecting which event notifications to combine from one or more event notification streams. The one or more event notification streams are parsed, and event notifications are selected to initialize a new event notification stream, where event notifications in this stream correspond to instances of the output function when provided a set of event notifications from the one or more event notification streams as input values. When an event notification is published to the one or more event notification streams meeting the criteria specified in the output function, the new event notification stream publishes an event notification corresponding to an output value from the output function.

15 Claims, 3 Drawing Sheets

```
PROGRAM  300

┌─────────────────┐  ┌─────────────────┐  ┌─────────────────┐
│EVENT NOTIFICATION│  │EVENT NOTIFICATION│  │ OUTPUT FUNCTION │
│     STREAMS      │  │      STREAM      │  │     OUTPUT      │
│  DATASTORE MOD   │  │  MONITORING MOD  │  │ GENERATION MOD  │
│       302        │  │       306        │  │       310       │
└─────────────────┘  └─────────────────┘  └─────────────────┘

┌─────────────────┐  ┌─────────────────┐  ┌─────────────────┐
│ OUTPUT FUNCTION │  │EVENT NOTIFICATION│  │ OUTPUT FUNCTION │
│  DATASTORE MOD  │  │     SUBSETS      │  │EVENT NOTIFICATION│
│                 │  │ DETERMINATION MOD│  │  PUBLISHING MOD │
│       304       │  │       308        │  │       312       │
└─────────────────┘  └─────────────────┘  └─────────────────┘
```

(56) References Cited

U.S. PATENT DOCUMENTS

| | | |
|---|---|---|
| 10,324,773 B2 | 6/2019 | Wing |
| 2008/0301135 A1* | 12/2008 | Alves ................ G06F 16/2453 |
| 2009/0070785 A1* | 3/2009 | Alvez .................... H04L 67/61 |
| | | 719/318 |
| 2009/0271483 A1 | 10/2009 | Whitehead |
| 2011/0016123 A1 | 1/2011 | Pandey |
| 2011/0040887 A1 | 2/2011 | Andrade |
| 2020/0285646 A1 | 9/2020 | Tudoran |
| 2021/0216549 A1 | 7/2021 | Bernstein |
| 2021/0248613 A1 | 8/2021 | Zhou |

OTHER PUBLICATIONS

"IBM Streams", 4.2.1, Downloaded from the Internet on Feb. 10, 2022, <https://www.ibm.com/support/knowledgecenter/en/SSCRJU_4.2.1/com.IBM.streams.ref.doc/doc/langoverview.html>.

* cited by examiner

FUNCTION DEFINED EVENT STREAMS FROM MULTIPLE EVENT STREAMS AND EVENTS

BACKGROUND

The present invention relates generally to the field of event driven software architectures, and more particularly to event streaming platforms.

The Wikipedia entry for "Event-driven architecture" (as of Feb. 27, 2022) states as follows: "Event-driven architecture (EDA) is a software architecture paradigm promoting the production, detection, consumption of, and reaction to events. An event can be defined as "a significant change in state". For example, when a consumer purchases a car, the car's state changes from "for sale" to "sold". A car dealer's system architecture may treat this state change as an event whose occurrence can be made known to other applications within the architecture. From a formal perspective, what is produced, published, propagated, detected or consumed is a (typically asynchronous) message called the event notification, and not the event itself, which is the state change that triggered the message emission. Events do not travel, they just occur. However, the term event is often used metonymically to denote the notification message itself, which may lead to some confusion. This is due to Event-Driven architectures often being designed atop message-driven architectures, where such communication pattern requires one of the inputs to be text-only, the message, to differentiate how each communication should be handled. This architectural pattern may be applied by the design and implementation of applications and systems that transmit events among loosely coupled software components and services. An event-driven system typically consists of event emitters (or agents), event consumers (or sinks), and event channels. Emitters have the responsibility to detect, gather, and transfer events. An Event Emitter does not know the consumers of the event, it does not even know if a consumer exists, and in case it exists, it does not know how the event is used or further processed. Sinks have the responsibility of applying a reaction as soon as an event is presented. The reaction might or might not be completely provided by the sink itself. For instance, the sink might just have the responsibility to filter, transform and forward the event to another component or it might provide a self-contained reaction to such event. Event channels are conduits in which events are transmitted from event emitters to event consumers. The knowledge of the correct distribution of events is exclusively present within the event channel."

The Wikipedia entry for "service-oriented architecture" (as of Feb. 27, 2022) states as follows: "In software engineering, service-oriented architecture (SOA) is an architectural style that supports service orientation. By consequence, it is as well applied in the field of software design where services are provided to the other components by application components, through a communication protocol over a network. A service is a discrete unit of functionality that can be accessed remotely and acted upon and updated independently, such as retrieving a credit card statement online. SOA is also intended to be independent of vendors, products and technologies. Service orientation is a way of thinking in terms of services and service-based development and the outcomes of services. A service has four properties according to one of many definitions of SOA: It logically represents a repeatable business activity with a specified outcome. It is self-contained. It is a black box for its consumers, meaning the consumer does not have to be aware of the service's inner workings. It may be composed of other services. Different services can be used in conjunction as a service mesh to provide the functionality of a large software application, a principle SOA shares with modular programming. Service-oriented architecture integrates distributed, separately maintained and deployed software components. It is enabled by technologies and standards that facilitate components' communication and cooperation over a network, especially over an IP network."

The Wikipedia entry for "Event-driven SOA" (as of Feb. 27, 2022) states as follows: "Event-driven SOA is a form of service-oriented architecture (SOA), combining the intelligence and proactiveness of event-driven architecture with the organizational capabilities found in service offerings. Before event-driven SOA, the typical SOA platform orchestrated services centrally, through pre-defined business processes, assuming that what should have already been triggered is defined in a business process. This older approach (sometimes called SOA 1.0) does not account for events that occur across, or outside of, specific business processes. Thus complex events, in which a pattern of activities—both non-scheduled and scheduled—should trigger a set of services is not accounted for in traditional SOA 1.0 architecture."

The Wikipedia entry for "application programming interface" (as of Feb. 27, 2022) states as follows: "An application programming interface (API) is a connection between computers or between computer programs. It is a type of software interface, offering a service to other pieces of software. In contrast to a user interface, which connects a computer to a person, an application programming interface connects computers or pieces of software to each other. It is not intended to be used directly by a person (the end user) other than a computer programmer who is incorporating it into software. An API is often made up of different parts which act as tools or services that are available to the programmer. A program or a programmer that uses one of these parts is said to call that portion of the API. The calls that make up the API are also known as subroutines, methods, requests, or endpoints. An API specification defines these calls, meaning that it explains how to use or implement them. One purpose of APIs is to hide the internal details of how a system works, exposing only those parts a programmer will find useful and keeping them consistent even if the internal details later change."

SUMMARY

According to an aspect of the present invention, there is a method, computer program product and/or system for use with an event streaming platform in an event-driven architecture, where the event streaming platform receives a plurality of event streams and each event stream corresponds to a stream of event notifications published to the stream that performs the following operations (not necessarily in the following order): (i) receiving an output function corresponding to a mathematical combination of a specified subset of event streams in the plurality of event streams, where the output function further specifies, for each event stream in the subset, criteria for selecting subsets of event notifications within their respective event streams for inclusion in the mathematical combination; (ii) monitoring the plurality of event streams for newly published event notifications; and (iii) responsive to determining a newly published event notification corresponds to one of the subset of event streams, outputting an event notification to an output function event stream, where event notifications in the output function event stream correspond to results of the output function applied upon the selected subsets of event notifications from their respective event streams.

DETAILED DESCRIPTION

Some embodiments of the present invention are directed to techniques for function-defined output streams corresponding to combinations of events published to one or more event notification streams in an event-driven architecture with a plurality of event notification streams. An output function is received defining a combination of event notifications with criteria for selecting which event notifications to combine from one or more event notification streams. The one or more event notification streams are parsed, and event notifications are selected to initialize a new event notification stream, where event notifications in this stream correspond to instances of the output function when provided a set of event notifications from the one or more event notification streams as input values. When an event notification is published to the one or more event notification streams meeting the criteria specified in the output function, the new event notification stream publishes an event notification corresponding to an output value from the output function.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium (sometimes referred to as "machine readable storage medium") can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
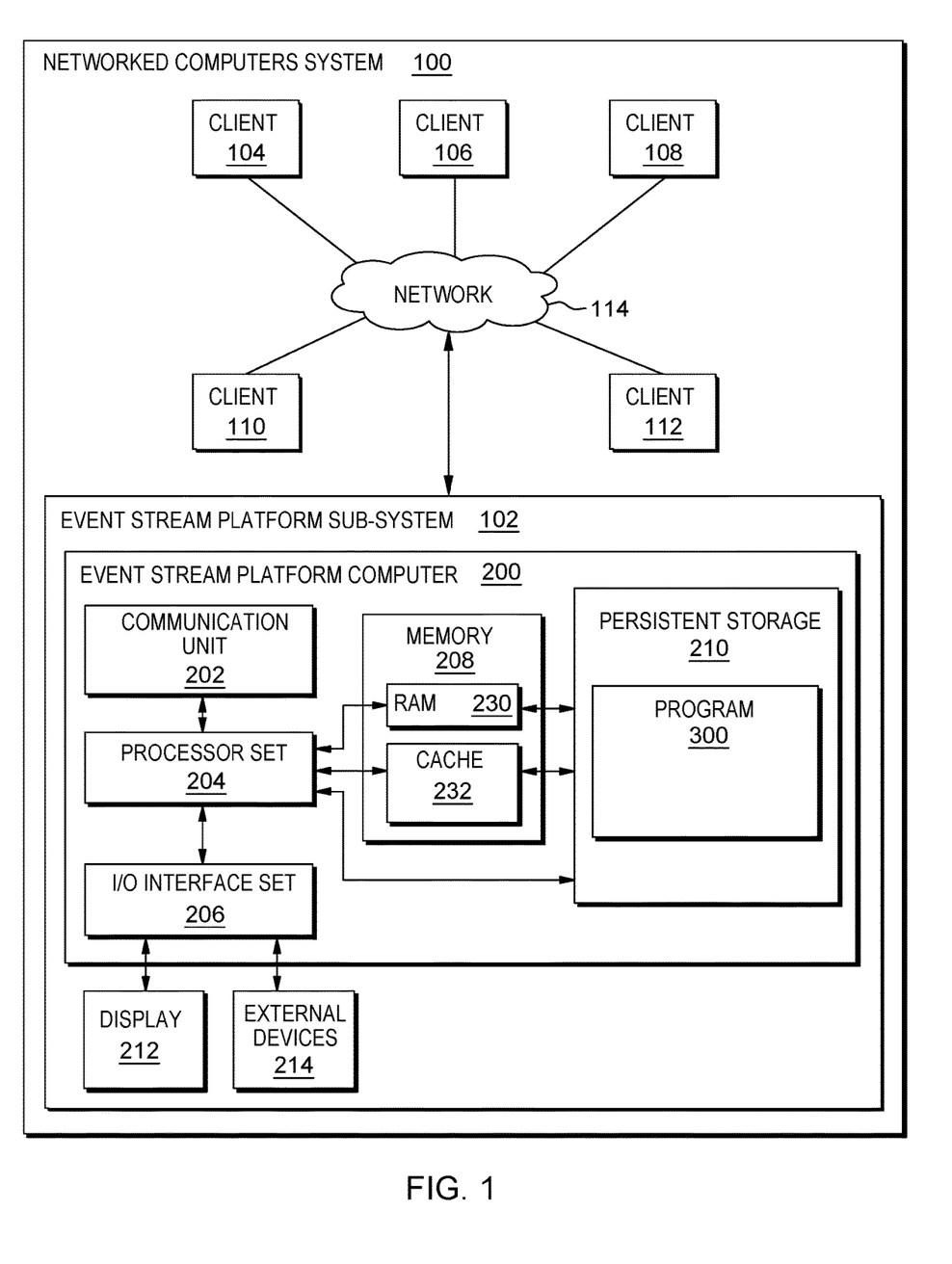
FIG. 1 is a block diagram view of a first embodiment of a system according to the present invention.

As shown in FIG. 1, networked computers system 100 is an embodiment of a hardware and software environment for use with various embodiments of the present invention, described in detail with reference to the Figures. Networked computers system 100 includes: event stream platform subsystem 102 (sometimes herein referred to, more simply, as subsystem 102); client subsystems 104, 106, 108, 110, 112; and communication network 114. Event stream platform subsystem 102 includes: event stream platform computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with event stream platform computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
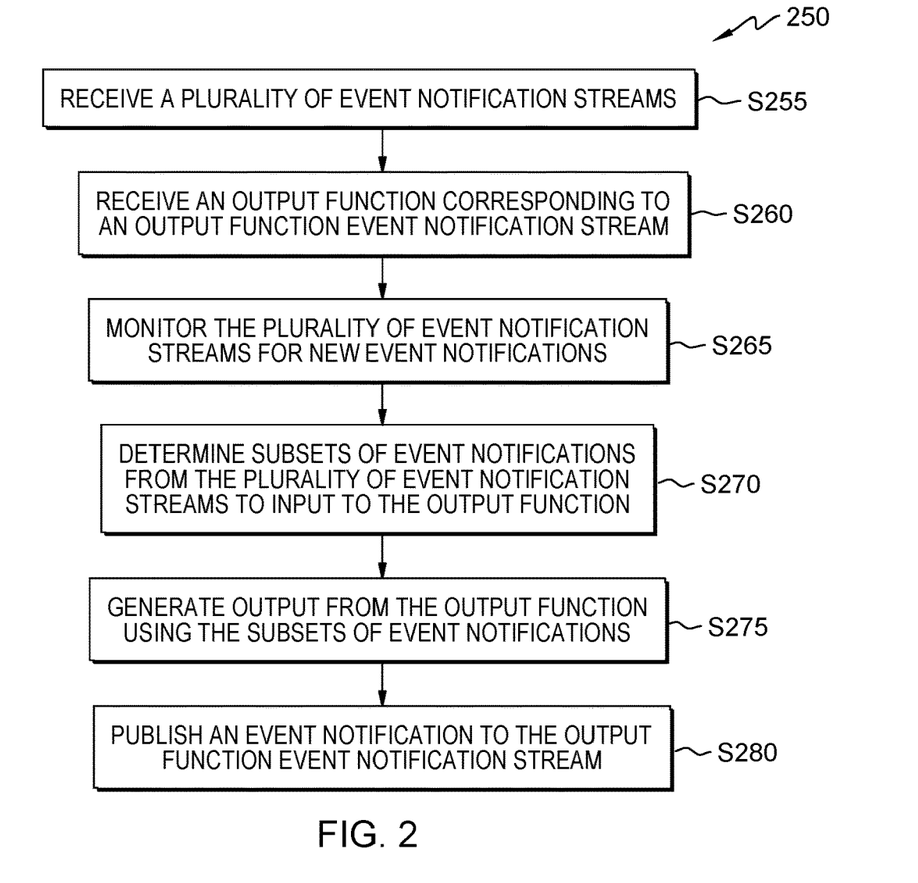
FIG. 2 is a flowchart showing a first embodiment method performed, at least in part, by the first embodiment system.
Figure 3:
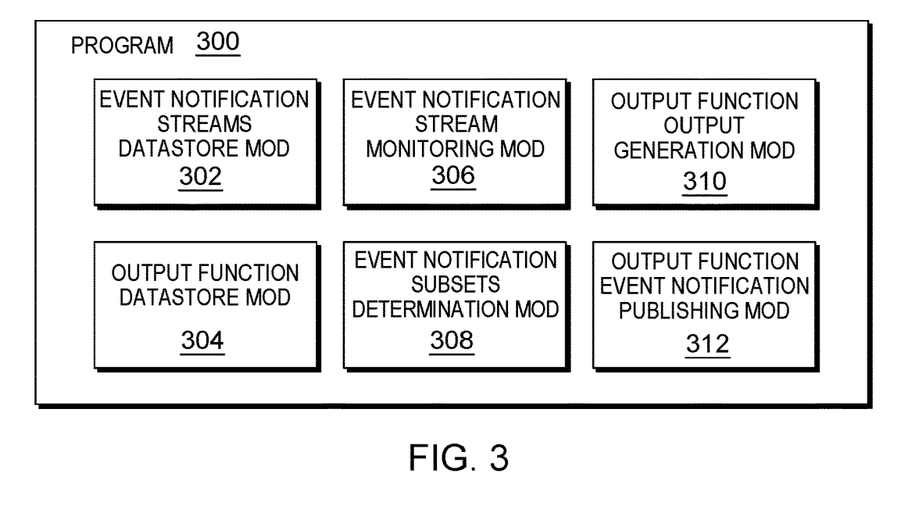
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where event notification streams datastore module ("mod") 302 receives a plurality of event notification streams. In this simplified embodiment, the plurality of event notification streams includes three event notification streams: (i) a first event notification stream with an identification label of Stream1 (referred to as stream 1) corresponding to a number of barrels of oil purchased in a transaction; (ii) a second event notification stream with an identification label of Stream2 (referred to as stream 2) corresponding to the reported price per barrel of oil in United States Dollars (USD); and (iii) a third event notification stream with an identification label of Stream3 (referred to as stream 3) corresponding to interest rates for lending funds. Each event notification stream originates from a software application built according to an event-driven SOA and integrated into an event stream (or event streaming) platform that serves as a hub for event notification streams from the various integrated software applications. For example, in this simplified embodiment, the application for stream 1 is hosted on client 104, the application for stream 2 is hosted on client 106, and the application for stream 3 is hosted on client 108.

Software applications integrated into the event streaming platform may publish event notifications to their corresponding event notification streams and receive event notifications that are published to the various event notification streams. Further, applications integrated into the event streaming platform may publish output functions to the event streaming platform as outlined below. In some alternative embodiments, output functions are submitted to the event streaming platform from software applications via an API which provides the software applications the ability to create or destroy output functions (and their corresponding output function event notification streams) on the fly. Such an API is contrasted with an administrative interface of the event streaming platform, which may be used by the event streaming platform to manage its publication of the event notification streams transmitted to it. This API includes syntax for defining a mathematical function that uses subsets of event notifications from target event notification streams (such as two or more streams) as variables to calculate an output value, such that new event notifications in any of the target event notification streams trigger a new instance of calculating the results of the function using the new event notifications as inputs for the function, and the results are then published to the output function event notification streams.

For stream 1, the five most recently published event notifications are as follows, ordered from oldest to most recent: (i) 100 [barrels]; (ii) 150 [barrels]; (iii) 125 [barrels]; (iv) 1000 [barrels]; and (v) 500 [barrels]. For stream 2 the five most recently published event notifications are as follows, ordered from oldest to most recent: (i) $95; (ii) $100; (iii) $110; (iv) $125; and (v) $150. For stream 3, the five most recently published event notifications are as follows, ordered from oldest to most recent: (i) 4%; (ii) 5%; (iii) 7%; (iv) 10%; and (v) 15%.

Processing proceeds to operation S260, where output function datastore mod 304 receives an output function corresponding to an output function event notification stream. In this simplified embodiment, output function is received from client 110 and includes, in addition to the output function itself, an instruction to the event stream platform to establish an event notification stream for this output function (hereafter referred to as an output stream) and to publish event notifications to this event notification stream. Each of the event notifications published to this event notification stream correspond to the results of the output function applied to subsets of event notifications from a set of target event notification streams (or set of target streams). When a new event notification is published to any of the event notification streams in the set of target streams, the output function is applied to the event notification streams in the set of target streams, using values from the event notifications of the target streams as input for the output function as defined by the output function. This output function defines which event notification streams are included in the set of target streams and may also include rules for each given event notification stream in the set of target streams that define which event notifications (or subsets of event notifications) in the given target stream to use in an instance of calculating the output function results. For example, the output function may use an identifier of an event notification stream as a variable in a mathematical calculation, such as:

Output_Function=Stream $n$×1,000,000

In the above example equation, invoking stream n without any further modifier (or rules) indicates that the output function is calculated using the value from the most recently published event notification of stream n. Stream n is effectively a variable used by the output function, with the value of that variable changing as event notifications are published to stream n. The presence of Stream n as a variable in this output function indicates that it is selected as part of the set of target streams for this output function.

Additionally, a modifier may be applied to stream 1, to indicate which event notifications to use as the value for Stream 1 when calculating the results of the output function. For example, this modifier may tell the output function to select the lowest value of from among the two most recently published event notifications for stream 1, or to average the values for the five most recently published event notifications for stream 1, etc., serving as a set of criteria indicating which event notifications from a given event notification stream to use. By default (absent any modifiers applied to the event notification stream) the criteria indicate to use the value from the most recently published event notification in the given event notification stream.

In this simplified embodiment, the output function is as follows:

Output Function=Stream1×min 2(Stream2)

In this output function of the simplified embodiment, the min 2 modifier applied to Stream2 indicates to select the lowest (or minimum) value from among the values corresponding to the two most recently published event notifications in stream 2. At this time, those values are as follows (indicated above at operation S255): (i) $125; and (ii) $150. The minimum value from among those two values is $125. Also in this output function, invoking the identification label of stream 1 (Stream1) indicates to select the value of the most recently published event notification in stream 1. At this time, that value (as indicated above at operation S255) is 500 [barrels]. Thus, both stream 1 and stream 2 are selected for the set of target streams for this output function, but stream 3 is excluded from the set of target streams, as it is not present in the output function. When the output function is received, as is the case here at S260, the output stream is initialized with an event notification corresponding to applying the output function to the event notification streams at the time the output function is received, resulting in the following calculation:

Output Function=500×min($125,$150)

The results of this application or instance of the output function are $62,500 (after the min operation selects the minimum value between $125 and $150, which is $125) and an event notification is published to the output stream with this value. While this is a simplified embodiment, the output function may use an arbitrary number of event notification streams as input, and for each of those event notification streams, an arbitrary number of event notifications may be used in any given function. For example, the output function may calculate a result using 100 event notification streams as inputs, with one of those event notification streams having a modifier that indicates to average the values from the ten most recently published event notifications in that event notification stream, while another event notification stream has a modifier that indicates to sum up the values from the five most recently published event notifications in that event notification stream. To illustrate this idea using the event notification streams of the simplified embodiment, an alternative output function is defined as:

Alternative Output Function=Stream1×min 2(Stream2)×max 5(Stream3)

This alternative output function is similar to the output function described in the simplified embodiment, but also include a variable multiplier that corresponds to the maximum value selected from the values of the five most recently published event notifications on stream 3.

While the above output functions are examples, some alternative output functions take an arbitrary number of event notifications from one or more input streams over a given time interval. For example, an output stream may take event notifications as input from two input streams, input stream 1 and input stream 2, where the ten most recent event notifications from input stream 1 are averaged while all the event notifications over the last hour are averages from input stream 2. Other time intervals may be used as well. As a further alternative, an output function may specify an offset or range of events notifications that do not correspond or include the most recent event notification from an input stream. For example, if an input stream labels event notifications from T0 to Tn, with T0 being the most recently published event notification, an output function may specify that the maximum value from event notifications T5 through T10 are used as input for the output function, essentially bypassing event notifications T0 through T4. The example of T5 through T10 is illustrative, where any specified range of event notifications in a given event notification stream may be used, instead of only the most recent (or a set of the most recent) event notifications.

Processing proceeds to operation S265, where event notification stream monitoring mod 306 monitors the plurality of event notification streams for new event notifications. In this simplified embodiment, event notification stream monitoring mod 306 monitors each of the event notification streams that were received at S255, monitoring for newly published events on each of the three event notification streams (stream 1, stream 2 and stream 3). Any event notifications published to any of these streams are detected by event notification stream monitoring mod 306. After some time, a new event notification is published on stream 2, where the newly published event notification has a value of "$155." For stream 2 the five most recently published event notifications are as follows, ordered from oldest to most recent: (i) $100; (ii) $110; (iii) $125; (iv) $150; and (v) $155. There are more than five events recorded in stream 2, but the five most recently published events are discussed above for simplicity of discussion. When event notification stream monitoring mod 306 determines that a new event notification has been published to any of the target streams (which are stream 1 and stream 2 in this simplified embodiment), processing proceeds to S270.

Processing proceeds to operation S270, where event notification subsets determination mod 308 determines subsets of event notifications from the plurality of event streams to input to the output function. In this simplified embodiment, event notification subsets determination mod 308 first determines what event notification streams are selected for the set of target streams for this output function, which are indicated as stream 1 and stream 2 based on the output function received at S260. Next, for each given event notification stream in the set of target streams, event notification subsets determination mod 308 uses any modifiers applied to the given notification event stream to determine the subset of event notifications to use. For stream 1, the output function indicates to use the value of the most recently published event notification, which is still 500 [barrels], so the subset of event notifications for stream 1 is determined as a subset of one event notification, with that one event notification having a value of 500 [barrels]. For stream 2, the output function indicates to use the minimum value selected from the values of the two most recently published event notifications. As indicated at S265, a new event notification was published on stream 2. Now, the two most recently published event notifications are as follows, in order of oldest to most recently published: (i) $150; (ii) $155. As such, the subset of event notifications for stream 2 is determined to have two event notifications, a first event notification with a value of $150 and a second event notification with a value of $155.

Processing proceeds to operation S275, where output function output generation mod 310 generates output from the output function using the subsets of event notifications. In this simplified embodiment, output function output generation mod 310 inserts the values of the subsets of event notifications into the output function in order to calculate and/or generate an output value. The resulting output function is as follows:

Output Function=500×min($150,$155)

The output value generated by this output function is $75,000 (after the min operation determines that $150 is the minimum value between the subset of $150 and $155).

Processing proceeds to operation S280, where output function event notification publishing mod 312 publishes an event notification to the output notification stream. In this simplified embodiment, the value of the event notification published to the output stream by output function event notification publishing mod 312 is the output value from S275, which is $75,000. Now, the output stream has two event notifications that have been published to it, in order of oldest to most recently published: (i) $62,500; and (ii) $75,000. The software application on client 110 which sent the output function to subsystem 102 (or any other clients integrated with the event stream platform) may then read the published event notifications on the output stream.

At this point, operations may return to S265 to continue monitoring the event notification streams for new event notifications. For example, if a new event notification is published to stream 1, with a value of 400 [barrels], operations would then proceed to operations S270, S275 and S280, with the output function at S275 now configured as follows:

Output Function=400×min($150,$155)

The output value of this example would be $60,000, a corresponding event notification would be published to the output stream, which would now have the following three event notifications: (i) $62,500; (ii) $75,000; and (iii) $60,000

In some alternative embodiments, any event notification streams, combinations of event notification streams, modifiers applied to event notification streams, and mathematical structure of the output function may be used. In yet further alternative embodiments, event stream platform includes administrative controls to limit how many output functions may be in concurrent operation, impose limits on how many event notification streams may be used in any given output function (and reject output functions that exceed this limit), or apply a maximum sampling rate to limit what percentage of newly published event notifications on any of the set of target streams initiate a corresponding event notification on the output stream (including determining subsets of event notifications, generating output values, etc.) In some alternative embodiments, the received output function at S260 may further include sampling rates for the output function provided by user input. These sampling rates included with the received output function may specify either a sampling rate for the output function itself (as described above in the administrative controls) or on an individual event notification stream basis for the event notification streams in the set of target streams. For example, using the output function in the simplified embodiment, the event notification stream of stream 1 may have a sampling rate of 10% (or one out of every ten notifications) while stream 2 may have a sampling rate of 100% (or every event notification). With these example sampling rates, every time an event notification is published on stream 2 (which is monitored at S265), processing would proceed to S270, while only one out of every ten event notifications published to stream 1 (also monitored at S265) would result in processing proceeding to S270. These sampling rates can be configured in the form of an additional modifier applied to the event notification stream in the output function, such as follows:

Output Function=(Stream1)10%×min 2(Stream2) 100%

Alternatively, a sampling rate of 100% is the default value, and does not need to be specified as above; omitting the 100% following Stream2 would result in the same output value.

III. Further Comments and/or Embodiments

Some embodiments of the present invention recognize the following facts, potential problems and/or potential areas for improvement with respect to the current state of the art: (i) many established institutions are on their journey to modernizing their application estate; (ii) Largely, this focuses on two key deliverables: (a) break down monolithic applications into smaller functional pieces of code and, (b) decouple applications by way of asynchronous messaging and events-based architecture; (iii) whilst the new architectural patterns enable institutions to be agile in delivering new capabilities and client-experiences; (iv) this is an important shift in organizations that have, historically, been slow to respond to market changes; (v) this is important especially in the current crisis as they need to find new revenue streams; (vi) as an institute goes on the journey to modernization, those applications that have been transformed are likely to be sending useful events to other applications that the target applications cannot consume and process at the same time; (vii) for example, if a payments application is processing retail and corporate payments at scale and using events-driven architecture, specific events could be used to adjust the capital reserves required by the bank; (viii) a single event or just a handful of events buried in millions of messages could be the ones that could make a big difference in the cash reserves required by the bank to operate; (ix) therefore, anything an institution, a bank in this instance, can do to identify and process certain events by a function would be helpful in operational effectiveness; (x) event streams are flows of messages that can be consumed by one or more applications, typically where each application determines its own progress through the stream by maintaining its own record of where in the stream it has read up to; (xi) applications are free to move backwards through the stream if they so wish; (xii) multiple event streams contain different types or category of data can exist at the same time in an event stream broker; (xiii) applications typically consume an event at a time from one or more streams, progressing through the events at their own pace; and (xiv) if an application wishes to combine data from multiple streams it is responsible for reading from the streams individually, then combining the data in whatever way it needs.

Some embodiments of the present invention may include one, or more, of the following operations, features, characteristics and/or advantages: (i) a way for an application to consume events which are a function of other events generated on one or more event streams; (ii) for example, if stream A contains events about share price, and stream B contains events about current exchange rate, an application can consume a system-generated events using a function stream C; (iii) where function stream C=f(A*B); (iv) enabling an application to provide a function to the event stream broker; (v) whereby the broker creates the new stream C; (vi) publishes new events to it whenever new events are published to stream A or B; and (v) a function language is provided that allows for all typical mathematical operations to be applied to the input streams:

```
instream <streamname> = <streamtopic>
inevent <eventname> = [0-9]* streamname
function <functionname> = (streamname|functionname) [+-*/^ sum avg] (streamname|functionname)
outstream <streamtopic> = functionname
```

Some embodiments of the present invention may include one, or more, of the following operations, features, characteristics and/or advantages: (i) An interesting facet of this language is the ability to define a function stream where more than one event can be used as input to the function; (ii) for example, a functional stream could be defined as "the 5 most recent events from stream A, multiplied by the latest event from stream B"; and (iii) using the above language this would be described as:

```
instream streamA = "housesales/winchester"
instream streamB = "exchangerates/GBP2USD"
inevent last5sales = 5 streamA
function averageSalesInUSD = last5sales * streamB
outstream "sales/recent" = averageSalesInUSD
```

Some embodiments of the present invention may include one, or more, of the following operations, features, characteristics and/or advantages: (i) the compound stream component described would be best implemented as an internal component of the event stream product; (ii) it comprises three sub-components; (iii) first, the function parser; (iv) this is responsible for receiving and parsing functions provided by applications or configuration; (v) next, function storage; (vi) this is used to store all of the parsed functions; (vii) lastly, the function handler; (viii) this component manages the resources necessary to process functions and produce output on all of the defined outstreams; (ix) for the function parser, there are two mechanisms by which a function can be provided to the function parser; (x) firstly, by an application delivering a chosen function through an API call that precedes messaging API calls; and (xi) for example, in psuedo-code:

```
connect(broker, username, password)
var function = 'instream streamA = "housesales/winchester\n" '
function += 'instream streamB = "exchangerates/GBP2USD" '
...
registerFunction(function)
getEvent(outstream)
getEvent(outstream)
getEvent(outstream)
...
disconnect( )
```

Some embodiments of the present invention may include one, or more, of the following operations, features, characteristics and/or advantages: (i) secondly, a function can be provided to the function parser by product configuration or through an administrative interface; and (ii) for example, a product configuration file might be defined as follows:

```
<settings.conf>
function:
instream streamA = "housesales/winchester"
instream streamB = "exchangerates/GBP2USD"
...
function:
[next function here]
```

Some embodiments of the present invention may include one, or more, of the following operations, features, characteristics and/or advantages: (i) in the case of an API registered function, the API shall include an option that defines the behavior when the application disconnects from the event stream broker; (ii) in one case, the function is removed when the application disconnects; (iii) in the other case, the function remains defined until removed by a further deleteFunction API call or via an administrative step to remove it from function storage; (iv) for function storage, in the case of administrative function definitions, this component is unnecessary since function definitions are implicitly provided via the settings file; (v) in the case of API function definitions, the function storage component takes functions passed by applications and appends them to a configuration file in the same format as administrative functions; (vi) for the function handler, the function handler processes function definitions defined in function storage; (vii) each function handler is responsible for launching a new system resource, such as a thread or process, to handle each defined function; (viii) the handler is required to: (a) register an event consumer on every instream defined in the function, (b) register an event producer on the outstream for the function, and (c) calculate a new compound event for every new event received on an instream, and use its own producer to send every compound event to the outstream; and (ix) there is a function management thread which has responsibility for: (a) maintaining a list of functions for which handlers are running, (b) restarting a handler in the case where one has stopped or failed, and (c) stopping a handler if a function is deregistered or removed from storage.

Some embodiments of the present invention may include one, or more, of the following operations, features, characteristics and/or advantages: (i) controlling resource-consumption caused by user-defined functions; (ii) since the system is intended to allow users to provide functions that will be executed by the event stream broker, a mechanism is described to prevent situations likely to lead to denial-of-service situations; (iii) firstly, the authority model of the broker is updated to allow an administrator to prevent arbitrary users from submitting function stream definitions; (iv) secondly, the suggested implementation will offer constraints on the characteristics of the function provided; (v) these include: (a) the number of historical events to include in the function, (b) the number of instreams to include in the function, (c) the allowed runtime duration of a given function, (d) the pausing of function streams when no consumers exist on the stream topic, (e) the total number of function streams allowed, and (f) a maximum sampling rate, such that only a percentage of events on the input streams cause function streams to generate new events themselves; (vi) break down monolithic applications into smaller functional pieces of code; and (vii) decouple applications by way of asynchronous messaging and events-based architecture.

Some embodiments of the present invention may include one, or more, of the following operations, features, characteristics and/or advantages: (i) event streams are flows of messages that can be consumed by one or more applications; (ii) typically where each application determines its own progress through the stream by maintaining its own record of where in the stream it has read up to; (iii) applications are free to move backwards through the stream if they so wish; (iv) multiple event streams contain different types or categories of data can exist at the same time in an event stream broker; (v) applications typically consume one event at a time from one or more streams, progressing through the events at their own pace; (vi) if an application wishes to combine data from multiple streams it is responsible for reading from the streams individually, then combining the data in whatever way it needs; (vii) providing a way for an application to consume events which are a function of other events generated on one or more event streams; (viii) for example, if stream A contains events about share price, and stream B contains events about current exchange rate, an application can consume a system-generated events using a function stream C; (ix) where: C=f(A*B); (x) allow an application to provide a function to the event stream broker, whereby the broker creates the new stream C and publishes new events to it whenever new events are published to stream A or B.

Some embodiments of the present invention may include one, or more, of the following operations, features, characteristics and/or advantages: (i) specifically, being able to describe functions that are applied over more than one message; (ii) there is a fundamental difference between an event streaming system, and a messaging system/broker; (iii) specifically, application-definable functions not limited by a strict 1-to-1 relationship between function and message; (iv) the ability to define a function that applies over an arbitrary number of messages across an arbitrary number of message streams; (v) examples such as rolling averages over a defined number of messages, or a defined period of time; (vi) to have a function that returns a new stream (or output stream) where each new event on the output stream is calculated based on N input messages, and N input streams; (vii) not just on 1 input message from a single stream; (viii) traditional message brokers do not keep messages that have been consumed; (ix) they are consumed and then they disappear; (x) an event stream has a different architecture; (xi) ability to create application-defined functions that operate over multiple input messages, from multiple input streams; and (xii) applying app-defined functions over arbitrary numbers of messages and streams, we're put together the attached diagram which shows just how differently our invention operates to the diagram from the prior art—and hence I think demonstrates the inventiveness in our disclosure.

Some embodiments of the present invention may include one, or more, of the following operations, features, characteristics and/or advantages: (i) combining events from multiple input streams; (ii) configuration of streaming processing functions via an application programming interface (as opposed to a traditional administration interface) combining of both multiple input streams AND multiple events from each stream; (iii) use of the application programming interface to define the functions involved, rather than an administrative interface, allows output streams to be created and destroyed on the fly by the users developing their applications, without the need for separate administrative APIs; (iv) the application of functions across multiple messages in a stream; (v) a way of configuring functions via an application programming interface (API); (vi) a way of applying functions over multiple events from each stream, or indeed of combining multiple streams together via that function; (vii) no attempt to use functions to include or exclude certain events from the input streams, but instead lets the user combine arbitrary numbers of events from arbitrary numbers of streams to produce a new output stream; (viii) applying a function over multiple input events; (ix) applying a function over multiple input streams; (x) take multiple input streams, and apply functions across several of them in order to produce a new output stream; (xi) the application of a single function over multiple input streams, and multiple events from each stream; (xii) events that are generated from the application of a function over several input streams, and several messages on each stream; (xiii) the number of messages from each stream is configurable as part of the function, as is the means by which each stream's output is combined to make a single event on the output stream; (xiv) in an example, a single event from stream 1 is multiplied by a rolling maximum of the most recent 3 events from stream 2, which is then multiplied by the average of the most recent 2 events from stream 3, to produce a single new event published to the output stream 4; and (xv) allowing a function to be applied not only over the most recent N messages from a stream, but from multiple messages much earlier in the stream.

Figure 4:
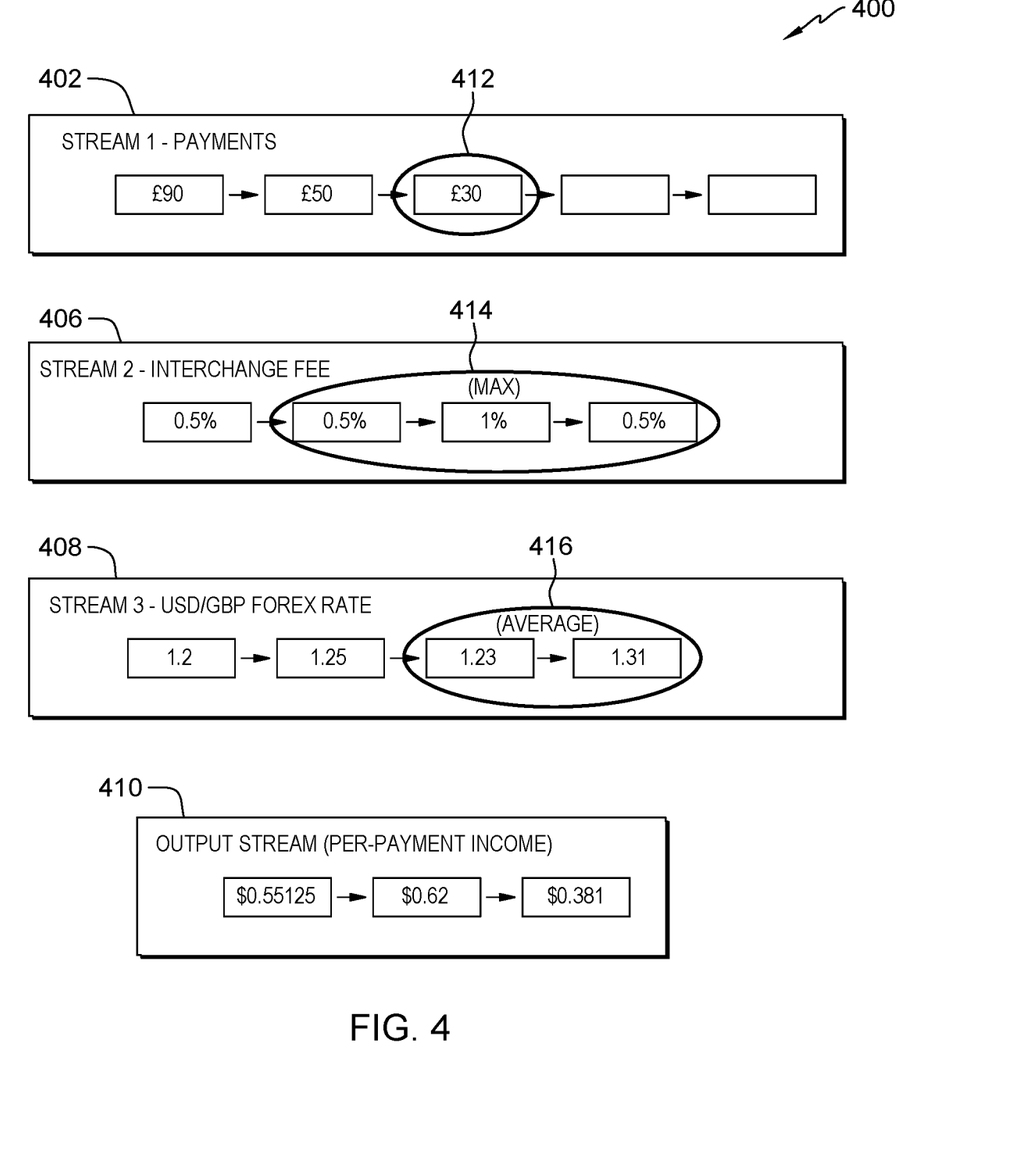
FIG. 4 is a screenshot view generated by an embodiment system.

Shown in screenshot 400 of FIG. 4 is an example of an output function stream combining input from several event streams, including: (i) stream 1 payments stream 402; (ii) stream 2 interchange fee stream 406; (iii) stream 3 USD/GBP FOREX rate stream 408; (iv) output stream 410; (v) stream 1 selected event 412; (vi) stream 2 selected events 414; and (vii) stream 3 selected events 416. In this example, the output function is specified as follows: for each single event published to stream 1 402 (shown as stream 1 selected event 412), multiply said event by a rolling maximum of the most recent 3 events from stream 2 406 (which is shown as stream 2 selected events 414), which is then multiplied by the average of the most recent 2 events from stream 3 408 (which is shown as stream 3 selected events 416), to produce a single new event published to output stream 410. When a new event is published to either of stream 1 402, stream 2 404, or stream 3 408, the output function is applied as appropriate to the events of their corresponding streams and a new event, corresponding to the output of that function, is published to output stream 410.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) for use with an event streaming platform (ESP) in an event-driven architecture, the CIM comprising:

receiving, at the ESP, a plurality of event streams, wherein each event stream of the plurality originates from a respective software application, of various software applications integrated into the ESP, and comprises a stream of event notifications published by its respective software application, and wherein the ESP serves as a hub for event notification streams from the various software applications;

receiving an output function from a software application, of the various software applications, via an application programming interface which provides the software application ability to define the output function, wherein the output function comprises a mathematical combination of a specified subset of at least two event streams of the plurality of event streams, and wherein the output function further specifies, for each event stream in the specified subset, criteria for selecting subsets of event notifications within their respective event streams as variables to calculate an output value via the mathematical combination, and wherein receipt of the output function also includes receiving instructions to create, and publish to, an output stream at the ESP which corresponds to the output function;

upon receipt of the output function, creating the output stream at the ESP and initializing the output stream with an event notification value by applying the output function to the specified subset;

monitoring the plurality of event streams for newly published event notifications;

responsive to determining a newly published event notification corresponds to one of the event streams of the specified subset, publishing a next event notification value to the output stream at the ESP, where event notification values in the output stream correspond to results of the output function applied upon the selected subsets of event notifications from their respective event streams; and consuming, at the software application, the event notification values in the output stream.

2. The CIM of claim 1, wherein the application program interface is designed such that applications integrated with the event streaming platform may create output function event streams on the fly by submitting an output function to the event streaming platform.

3. The CIM of claim 1, wherein for at least one event stream of the subset of event streams, the selected subset of event notifications from the at least one event stream includes at least two event notifications.

4. The CIM of claim 1, wherein for at least one event stream of the subset of event streams, the criteria for selecting subsets of event notifications within the at least one event stream includes mathematical operations applied to a subset of two or more event notifications in the at least one event stream selected from the group consisting of: averaging values of two or more event notifications, selecting a maximum value from among two or more event notifications, selecting a minimum value from among two or more event notifications, summing values for two or more event notifications, and multiplying values for two or more event notifications.

5. The CIM of claim 1, further comprising:

receiving a user input data set indicative of a maximum sampling rate for the output function, indicative of a percentage of newly published event notifications of the subset of event streams that initiate outputting an event notification to the output stream.

6. A computer program product (CPP) for use with an event streaming platform (ESP) in an event-driven architecture, the CPP comprising:

a machine readable storage device; and computer code stored on the machine readable storage device, with the computer code including instructions for causing a processor(s) set to perform operations including the following:

receiving, at the ESP, a plurality of event streams, wherein each event stream of the plurality originates from a respective software application, of various software applications integrated into the ESP, and comprises a stream of event notifications published by its respective software application, and wherein the ESP serves as a hub for event notification streams from the various software applications;

receiving an output function from a software application, of the various software applications, via an application programming interface which provides the software application ability to define the output function, wherein the output function comprises a mathematical combination of a specified subset of at least two event streams of the plurality of event streams, and wherein the output function further specifies, for each event stream in the specified subset, criteria for selecting subsets of event notifications within their respective event streams as variables to calculate an output value via the mathematical combination, and wherein receipt of the output function also includes receiving instructions to create, and publish to, an output stream at the ESP which corresponds to the output function;

upon receipt of the output function, creating the output stream at the ESP and initializing the output stream with an event notification value by applying the output function to the specified subset;

monitoring the plurality of event streams for newly published event notifications;

responsive to determining a newly published event notification corresponds to one of the event streams of the specified subset, publishing a next event notification value to the output stream at the ESP, where event notification values in the output stream correspond to results of the output function applied upon the selected subsets of event notifications from their respective event streams; and consuming, at the software application, the event notification values in the output stream.

7. The CPP of claim 6, wherein the application program interface is designed such that applications integrated with the event streaming platform may create output function event streams on the fly by submitting an output function to the event streaming platform.

8. The CPP of claim 6, wherein for at least one event stream of the subset of event streams, the selected subset of event notifications from the at least one event stream includes at least two event notifications.

9. The CPP of claim 6, wherein for at least one event stream of the subset of event streams, the criteria for selecting subsets of event notifications within the at least one event stream includes mathematical operations applied to a subset of two or more event notifications in the at least one event stream selected from the group consisting of: averaging values of two or more event notifications, selecting a maximum value from among two or more event notifications, selecting a minimum value from among two or more event notifications, summing values for two or more event notifications, and multiplying values for two or more event notifications.

10. The CPP of claim 6, wherein the computer code further includes instructions for causing the processor(s) set to perform the following operations:

receiving a user input data set indicative of a maximum sampling rate for the output function, indicative of a percentage of newly published event notifications of the subset of event streams that initiate outputting an event notification to the output stream.

11. A computer system (CS) for use with an event streaming platform (ESP) in an event-driven architecture, the CS comprising:

a processor(s) set;
a machine readable storage device; and
computer code stored on the machine readable storage device, with the computer code including instructions for causing the processor(s) set to perform operations including the following:

receiving, at the ESP, a plurality of event streams, wherein each event stream of the plurality originates from a respective software application, of various software applications integrated into the ESP, and comprises a stream of event notifications published by its respective software application, and wherein the ESP serves as a hub for event notification streams from the various software applications;

receiving an output function from a software application, of the various software applications, via an application programming interface which provides the software application ability to define the output function, wherein the output function comprises a mathematical combination of a specified subset of at least two event streams of the plurality of event streams, and wherein the output function further specifies, for each event stream in the specified subset, criteria for selecting subsets of event notifications within their respective event streams as variables to calculate an output value via the mathematical combination, and wherein receipt of the output function also includes receiving instructions to create, and publish to, an output stream at the ESP which corresponds to the output function;

upon receipt of the output function, creating the output stream at the ESP and initializing the output stream with an event notification value by applying the output function to the specified subset;

monitoring the plurality of event streams for newly published event notifications;

responsive to determining a newly published event notification corresponds to one of the event streams of the specified subset, publishing a next event notification value to the output stream at the ESP, where event notification values in the output stream correspond to results of the output function applied upon the selected subsets of event notifications from their respective event streams; and consuming, at the software application, the event notification values in the output stream.

12. The CS of claim 11, wherein the application program interface is designed such that applications integrated with the event streaming platform may create output function event streams on the fly by submitting an output function to the event streaming platform.

13. The CS of claim 11, wherein for at least one event stream of the subset of event streams, the selected subset of event notifications from the at least one event stream includes at least two event notifications.

14. The CS of claim 11, wherein for at least one event stream of the subset of event streams, the criteria for selecting subsets of event notifications within the at least one event stream includes mathematical operations applied to a subset of two or more event notifications in the at least one event stream selected from the group consisting of: averaging values of two or more event notifications, selecting a maximum value from among two or more event notifications, selecting a minimum value from among two or more event notifications, summing values for two or more event notifications, and multiplying values for two or more event notifications.

15. The CS of claim 11, wherein the computer code further includes instructions for causing the processor(s) set to perform the following operations:

receiving a user input data set indicative of a maximum sampling rate for the output function, indicative of a percentage of newly published event notifications of the subset of event streams that initiate outputting an event notification to the output stream.

\* \* \* \* \*